Jan. 8, 1946.     F. R. BALCAR     2,392,569
EXTRACTION OF GLYCERIN FROM FERMENTATION RESIDUES
Filed Oct. 1, 1943
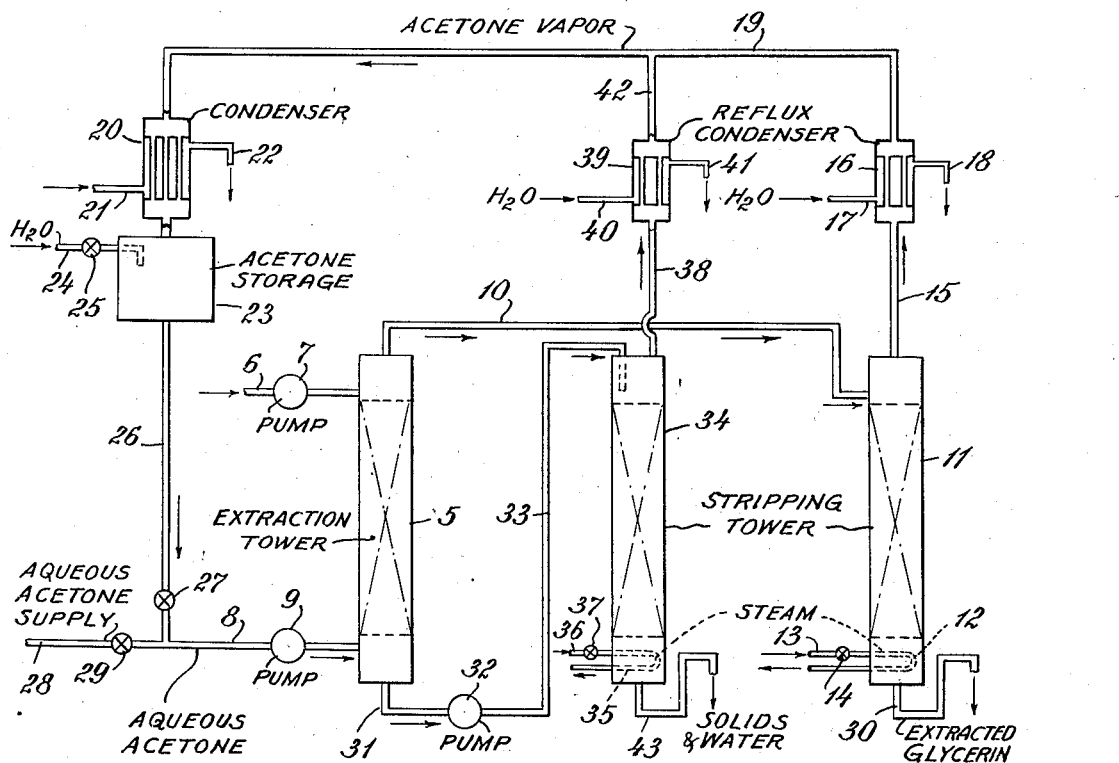
INVENTOR.
Frederick R. Balcar
BY
ATTORNEYS.

Patented Jan. 8, 1946

2,392,569

UNITED STATES PATENT OFFICE 2,392,569

EXTRACTION OF GLYCERIN FROM FERMENTATION RESIDUES

Frederick R. Balcar, Stamford, Conn., assignor, by mesne assignments, to U. S. Industrial Chemicals, Inc., New York, N. Y., a corporation of Delaware Application October 1, 1943, Serial No. 504,634

4 Claims. (Cl. 260—637)

This invention relates to the recovery of glycerin from distillery slop or the residue after distillation of alcohol produced by fermentation of molasses and other carbohydrate material.

As is well known, alcoholic fermentation produces a proportion of glycerin, and by appropriate modification of the procedure an increase in the amount of glycerin available may be obtained. The slop remaining after the distillation of alcohol contains, in addition to glycerin, a large amount of water and a considerable proportion of "solids" which are usually defined as material other than glycerin, non-volatile at 100–105° C. Some of the water may be removed readily from the "thin slop" by ordinary methods of concentration, such as multiple effect evaporation.

The recovery of glycerin from the distillation residue obtained after removal of the alcohol is difficult and has been the subject of many investigations. Such recovery is complicated by the fact that there is present a considerable amount of high boiling soluble material having characteristics so similar to those of glycerin as to make the separation from glycerin a matter of considerable difficulty. For example, the economic separation of glycerin from these contaminants by any of the distillation methods usually applicable to glycerin prepared from soap stock has so far proved to be commercially impracticable. The character of the residue is such as to make heat transfer difficult and resulting distillation very slow. If increased heat is applied, the formation of volatile decomposition products results in an impure glycerin. Such increased temperature also causes decomposition and loss of glycerin. To avoid such difficulties, attempts have been made heretofore to extract glycerin from the slop by the use of solvents, but such attempts have proved to be economically and practically unworkable.

It is the object of the invention to provide a simple, economical and effective method of recovering glycerin from concentrated distillery slop, thereby saving a substantial quantity of glycerin which has heretofore been unavailable for commercial use.

Other objects and advantages of the invention will be apparent as it is better understood by reference to the following specification and the accompanying drawing, which illustrates diagrammatically an apparatus suitable for the practice of the procedure. Details of the apparatus which are well known to those skilled in the art have been omitted for the purpose of clarity.

I have discovered that glycerin can be recovered successfully and economically from concentrated distillery slop by extraction with aqueous acetone. For effective operation, the concentration of the slop should be such that the residue contains from 30–50% by weight of solids, as hereinbefore defined, and preferably about 45%. The aqueous acetone should have an acetone concentration not exceeding 90% or less than about 50% by volume. If more concentrated acetone is used, the raffinate or residue of solids will be dehydrated to such an extent that it will not flow. On the other hand, a lower concentration of acetone prevents satisfactory separation. For most satisfactory operation, 70–90% acetone is preferred, and 80% acetone gives optimum results under the conditions hereinafter described. Under such conditions, substantially complete extraction of glycerin can be obtained by using 2–4 volumes of aqueous acetone per volume of concentrated residue. The acetone is recovered for further use by stripping the products of the extraction.

Referring to the drawing, 5 indicates a suitable tower which may be open or packed with the usual devices to facilitate contact of the materials passing therethrough. The concentrated distillery slop is introduced to the top of the tower through a pipe 6 and pump 7 and flows downwardly therein counter-current to the aqueous acetone which is introduced through a pipe 8 and pump 9. The counter-current flow results in extraction by the acetone of all of the glycerin present in the slop with relatively minor amounts of other soluble constituents.

The extract, that is the acetone with the glycerin dissolved therein, escapes through a pipe 10 and is delivered to the top of a stripping tower 11 which may be open or packed as desired. A coil 12 in the bottom of the tower 11 is supplied with steam through a pipe 13 controlled by a valve 14. The extract is thus heated, and the acetone is thereby vaporized and escapes through a pipe 15 from the top of the tower 11. It passes through a reflux condenser 16 through which water is circulated by pipes 17 and 18. The condenser is operated so that less volatile impurities are eliminated from the acetone which is delivered through a pipe 19 to a condenser 20 through which water is circulated through pipes 21 and 22. The acetone vapor is condensed in the condenser 20 and is delivered to a storage receptacle 23. Water may be supplied to the storage receptacle through a pipe 24 controlled by a valve 25 to afford the desired concentration of acetone for use in the extraction. The aqueous acetone may be returned through a pipe 26 controlled by a valve 27 to the pipe 8 for further use. Additional aqueous acetone to make up losses is introduced through a pipe 28 controlled by a valve 29.

The extracted glycerin which separates in the stripping tower 11 is withdrawn through a pipe 30. The glycerin may contain some impurities and may be subjected to any suitable treatment to recover pure glycerin, as for example distillation under reduced pressure with superheated steam. The glycerin may be subjected to any other desired operation, such treatment forming no part of the present invention.

The raffinate, that is the residue from the extraction, which consists of the solids and other material not dissolved by the acetone, together with a part of the acetone solvent, is withdrawn from the bottom of the tower 5 through a pipe 31 and is delivered by a pump 32 and pipe 33 to the top of a stripping tower 34 which may be open or packed as desired. Steam is supplied to a coil 35 at the bottom of the tower 34 by a pipe 36 controlled by a valve 37. The heat thus supplied vaporizes any acetone which is carried by the raffinate. The vaporized acetone escapes through a pipe 38 to a reflux condenser 39 through which water is circulated by pipes 40 and 41. The condenser 39 is operated to return less volatile constituents of the vapor than acetone, which escapes through a pipe 42 to the pipe 19 and is thus delivered to the total condenser 20.

The solids and water are withdrawn from the tower 34 through a pipe 43. These may be discarded, or the solids may be recovered by evaporation for any use to which they may be adapted. By the procedure as described, substantially all of the acetone is recovered for reuse in the extraction.

As already indicated, the thin slop is preferably first concentrated. As an example, the concentrated slop may have the following composition in percentage by weight:

| | |
|---|---|
| Solids | 45.5 |
| Water | 44.0 |
| Glycerin | 10.5 |

Such a concentrated slop may be successfully extracted with a mixture of 80 parts by volume of acetone and 20 parts by volume of water. In general, from 2 to 4 volumes of solvent per volume of concentrated slop may be utilized in the extraction, and usually from 3 to 3.5 volumes of solvent per volume of concentrated slop gives the most satisfactory results. The operation has been successfully conducted to afford a recovery of 97% of the glycerin present in the concentrated slop.

Since aqueous acetone is used as the solvent fed to the extraction column, the recovery of acetone suitable for re-use is comparatively inexpensive. In the stripping towers very little reflux is required to produce a 70–90% acetone. This is in contrast with the case of solvents used in the anhydrous state or in the form of azeotropes which require a relatively high reflux ratio with a substantial increase in the consumption of steam, which to a large extent determines the cost of the operation of the process as a whole. The procedure as described can be conducted continuously and is otherwise economical because substantially all of the acetone is recovered with the expenditure of a minimum amount of steam.

Most of the solids present in the concentrated slop are retained in the raffinate, and such small amounts as may be dissolved by the acetone do not seriously affect the recovery of pure glycerin from the glycerin extract by ordinary distillation methods. While I prefer the counter-current method as described, the extraction can be conducted in any other manner, as for example a batch operation.

Various changes may be made in the details of the procedure and in the apparatus, without departing from the invention or sacrificing the advantages thereof.

I claim:

1. The method of recovering glycerin from concentrated distillery liquid slop which comprises subjecting a slop containing 30 to 50% by weight of material other than glycerin, non-volatile at 100–105° C. to counter-current extraction with aqueous acetone containing between 50 and 90% acetone by volume, separately withdrawing the acetone extract and the raffinate, and stripping the acetone extract to recover acetone therefrom.

2. The method of recovering glycerin from concentrated distillery liquid slop which comprises subjecting a slop containing 30 to 50% by weight of material other than glycerin, non-volatile at 100–105° C. to counter-current extraction with aqueous acetone containing between 50 and 90% acetone by volume, separately withdrawing the acetone extract and the raffinate, and stripping the acetone extract to recover acetone therefrom.

3. The method of recovering glycerin from concentrated distillery liquid slop which comprises subjecting a slop containing 30 to 50% by weight of material other than glycerin, non-volatile at 100–105° C. to counter-current extraction with aqueous acetone containing between 50 and 90% acetone by volume, separately withdrawing the acetone extract and the raffinate, separately stripping the acetone extract and the raffinate to recover acetone therefrom, and returning the acetone for further use in the extraction.

4. The method of recovering glycerin from concentrated distillery slop which comprises subjecting a liquid slop containing 30 to 50% by weight of material other than glycerin, non-volatile at 100–105° C. to counter-current extraction with aqueous acetone containing between 50 and 90% acetone by volume.

FREDERICK R. BALCAR.